Nov. 7, 1939.                H. RUEGG                2,179,425
                       DRIVE FOR VEHICLE AXLES
                       Filed Oct. 13, 1937          2 Sheets-Sheet 1
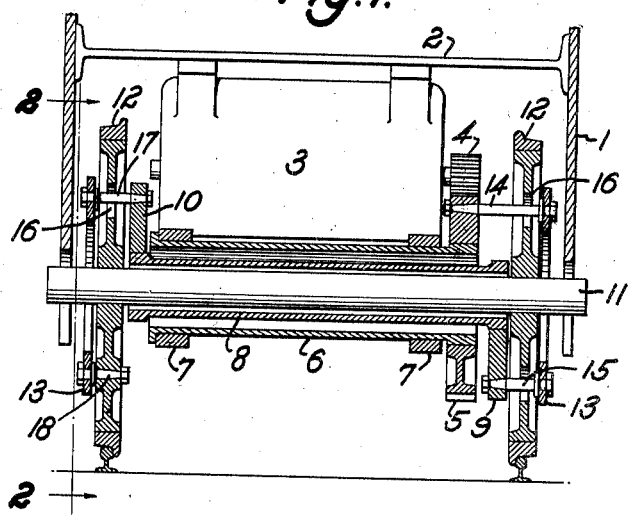
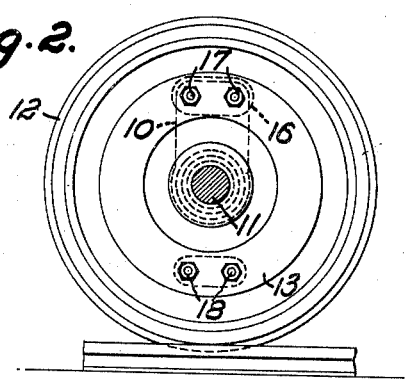
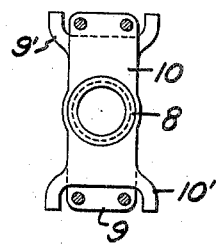
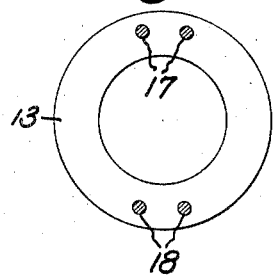
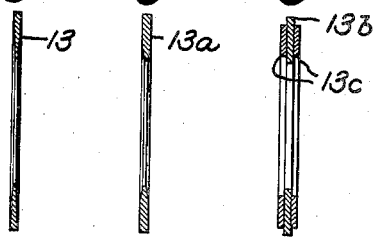
Inventor:
Heinrich Ruegg,
By Potter, Pierce & Scheffler
Attorneys.

Nov. 7, 1939.  H. RUEGG  2,179,425
DRIVE FOR VEHICLE AXLES
Filed Oct. 13, 1937  2 Sheets-Sheet 2
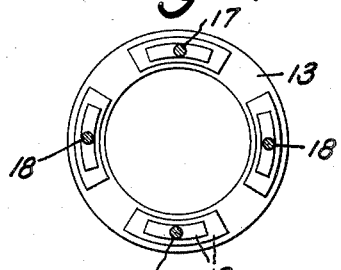
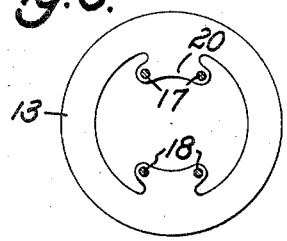 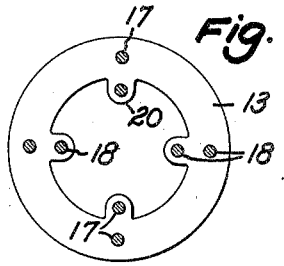
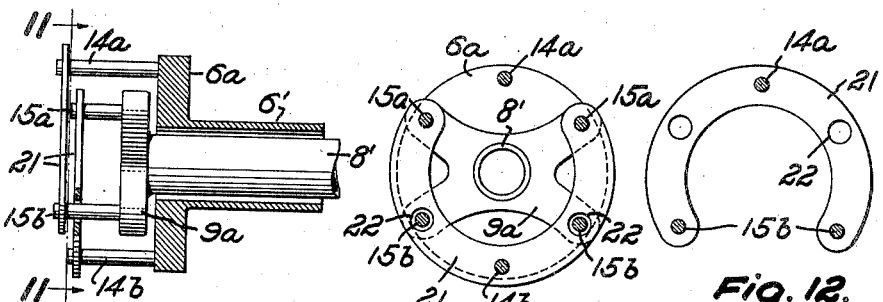
Inventor:
Heinrich Ruegg,
By Potter, Pierce & Scheffler,
Attorneys.

Patented Nov. 7, 1939

2,179,425

UNITED STATES PATENT OFFICE 2,179,425

DRIVE FOR VEHICLE AXLES

Heinrich Ruegg, Zurich, Switzerland, assignor to Aktiengesellschaft Brown, Boveri & Cie., Baden, Switzerland, a joint-stock company Application October 13, 1937, Serial No. 168,840
In Germany October 17, 1936

11 Claims. (Cl. 105—131)

This invention relates to drives for vehicle axles and particularly to a single axle drive for electrically operated vehicles.

It has been proposed to employ a hollow shaft and a Cardan shaft telescoped one within the other and coupled respectively to the driving gear and a vehicle wheel by disk springs, the plane of the disks being normal to the wheel axles. This arrangement permits longitudinal and angular displacements of the shafts but is practically rigid in a circumferential direction. The capacity of the disk springs for deflection could be increased by providing apertures in the disks, for example a row of concentric slots, but the manufacture of such equipment was involved and expensive.

An object of the present invention is to provide a drive for a vehicle axle which includes a vehicle shaft or axle telescoped within a hollow Cardan shaft, and disk plates of annular form which are connected to the drive members at points staggered in relation to each other in the direction of the circumference of the annular plates. An object is to provide a drive of the type stated in which radial arms are formed on the Cardan shaft, or alternatively on the annular disk plates, to receive the connections between the Cardan shaft and the disk plates. A further object is to provide a drive of the type stated in which certain of the annular disk plates are arranged outside of the vehicle wheels and are connected to the shafts by bolts passed through openings in the wheels. An object is to provide a drive including Cardan joints of the disk spring type in which the disk springs are of annular form and non-uniform radial cross-section. A further object is to provide a drive in which the annular disk plates of the Cardan joints are formed from groups of spring plates of approximately horseshoe shape.

These and other objects and advantages of the invention will be apparent from the following specification when taken with the accompanying drawings in which:

Fig. 1 is a fragmentary transverse sectional view of a motor driven vehicle having a single drive axle and associated members constituting an embodiment of this invention;

Fig. 2 is a vertical section on line 2—2 of Fig. 1;

Fig. 2a is an end elevation of a modified hollow Cardan shaft in which counterweights are provided;

Fig. 3 is an end elevation of one of the annular disk plates, with the connecting bolts shown in section;

Figs. 4, 5 and 6 are similar end elevations of other disk forms;

Figs. 7, 8 and 9 are central sectional views showing various sections that the disk plates may have;

Fig. 10 is a fragmentary transverse section through a modified Cardan joint;

Fig. 11 is a sectional view on the plane of line 11—11 of Fig. 10, looking in the direction of the arrows; and Fig. 12 is a sectional view on the same plane but looking in the opposite direction.

In Fig. 1, the reference numerals 1, 2 identify the side and cross members of the vehicle frame on which the driving motor 3 is rigidly supported. A gear 4 on the motor shaft meshes with the gear 5 on the hollow shaft 6 that is mounted in bearings 7 that may be secured to the motor or directly to the vehicle frame. The hollow Cardan shaft 8 extends through the shaft 6 and has radial arms 9, 10 projecting in opposite directions from its ends.

As shown in Fig. 2a, counterweights 9', 10' may be provided by arms extending radially from the shaft 8 in a direction opposite to that of the driving radial arms 9, 10, respectively. The driving axle 11 extends through the hollow Cardan shaft 8 and is rigidly secured to the vehicle driving wheels 12.

The Cardan joint or driving connecttion between gear 5 and tubular shaft 8 comprises the annular steel plate 13 at the outer side of the driving wheel 12, bolts 14 that extend between gear 5 and the plate 13, and bolts 15 that extend between the plate and the radial arm 9 of the Cardan shaft 8. The bolts 14, 15 pass through openings 16 in the driving wheel. This arrangement of the disk plate at the exterior of the wheel provides a simpler mounting and greater accessibility to the plates than is possible when the plates are located between the driving wheels.

The connection between the Cardan shaft 8 and the wheel 12 at the opposite side of the vehicle includes a similar annular plate 13 at the exterior of the wheel and connected to the radial arm 10 and the wheel 12 by bolts 17, 18, respectively. The plates 13 are spring steel plates and permit some longitudinal and angular movement of shafts 8 and 11. Power is transmitted from gear 5 through bolts 14 to ring plate 13, and from the latter through bolts 15 to the arm 9 of the Cardan shaft 8. From arm 10 at the opposite end of shaft 8, power is transmitted through bolts 17 to the other ring plate 13, and from the latter through bolts 18 to one wheel 12, then through axle 11 to the other driving wheel. It is to be noted that adjacent pairs of bolts, as viewed in the direction of power transmission, are staggered by 180° with respect to each other.

Torsional or circumferential resiliency is obtained by making the Cardan shaft 8 relatively thin to obtain a spring action. Additional resiliency may be obtained by a reversal of the relative arrangement of the connections at opposite sides of the vehicle to make the connection between hollow shafts 6 and 8 at the side of the motor away from gear 5, thus taking advantage of the resiliency of hollow shaft 8 in addition to that of shaft 6.

It is not essential that adjacent connections to the spring disks be staggered by 180° as symmetrical displacements of other magnitudes may be employed. As shown in Fig. 4, the displacement may be 90° and smaller leaf springs 19 may be applied in steps at the bolt connections to reinforce the annular spring disks 13.

The true annular disk form with a circular central aperture is preferred but is not essential. Variations from annular form are shown in Figs. 5 and 6, in that radial arms 20 may project inwardly from the plates to receive the bolts for connecting the plates to the Cardan shaft and other members of the drive. This arrangement of radial arms on the spring disks in place of the outwardly projecting arms 9, 10 of the Cardan shaft is particularly advantageous when the disks are arranged between the driving wheels 12.

In the several illustrated embodiments of the invention, the connecting bolts are all located at the same radial distance from the center line of the axle 11. This construction is preferred, but is not essential.

The cross-section of the spring disks may be varied from rectangular in accordance with the stresses set up in the disks. As shown in Fig. 7, the radial cross-section of the disks may be that of a wedge, or the outer part may be rectangular merging into a wedge form, as shown by disk 13a of Fig. 8. Alternatively, as shown in Fig. 9, the coupling disks may be built up from a plurality of plates 13b, 13c, the inner plate 13b being of greater radial width than the outer plates 13c.

It is frequently convenient to form the annular spring disks from segmental plates of arcuate form which are approximately horse-shoe sections, see Figs. 10 to 12. The illustrated Cardan joint between shafts 6' and 8' is at the left side of the vehicle and advantage is thus taken, as described above, of the torsional resiliency of both shafts. The hollow shaft 6' is driven through a gear 5, as shown in Fig. 1, and has a circumferential flange 6a into which diametrically opposed pins or bolts 14a, 14b are secured. The shaft 8' carries a four armed spider 9a which has pairs of pins or bolts 15a, 15b of different length projecting from the arms. An inner ring segment 21 of horseshoe shape has an opening through which the driving member 14b extends, and openings adjacent its ends in which a pair of the pin or bolt members 15a of the Cardan shaft 8' are seated. The segment 21 has other openings 22 through which the other and longer pair of members 15b extend. The other ring segment 21 is, or may be, identical with the described inner ring segment 21, but the segments are displaced by 180° from each other. The central aperture of the second segment receives the longer pin or bolt 14a of the shaft 6', and the longer members 15b. of shaft 8' are seated in the end apertures of the outer ring segment. The openings 22 in the outer ring segment permit access to the nuts or other fastening devices, not shown, on the ends of the members 15a. The four connecting members 15a, 15b of the shaft 8' and the two connecting members 14a, 14b of shaft 6' are preferably arranged at the corners of a regular hexagon.

The illustrated embodiments are to be understood as illustrative of the invention, and various changes and modifications may be made within the spirit of the invention as set forth in the following claims.

I claim:

1. A drive for a vehicle comprising an axle shaft secured to a pair of driving wheels, a hollow Cardan shaft surrounding said axle shaft, a source of power, and means including radially rigid annular spring metal plates each disposed in a plane normal to the axis of said axle shaft and bolt members connecting said Cardan shaft to both said power source and said axle shaft through said plates, said bolt members being spaced circumferentially around said annular spring metal plates and disposed substantially equidistantly from the axis of said axle shaft.

2. A drive as claimed in claim 1, wherein said connecting bolts are circumferentially displaced by substantially 180°.

3. A drive as claimed in claim 1, wherein said connecting bolts are circumferentially displaced by substantially 90°.

4. A drive for a vehicle axle comprising a source of power, a hollow Cardan shaft, a wheel axle extending through said Cardan shaft, and means including radially rigid annular spring metal plates connecting said Cardan shaft to said power source and said wheel axle; said spring plates being of greater diameter than said Cardan shaft and each disposed in a plane normal to the axis thereof, and said means including radial arms carried by said Cardan shaft and bolt members between said arms and said annular plates for connecting said annular plates to said Cardan shaft.

5. A drive for a vehicle axle comprising an axle secured to a pair of driving wheels, a hollow Cardan shaft surrounding said axle, a source of power, and means including spring plates disposed at the outer sides of said driving wheels in a plane normal to the axis thereof and connecting bolts between said plates and said Cardan shaft and connecting bolts between one of said plates and said power source and between another of said plates and said axle, said wheels being apertured to pass the connecting bolts.

6. A drive for a vehicle axle comprising an axle secured to driving wheels, a hollow Cardan shaft surrounding said axle, and means including radially rigid annular spring metal plates and bolt members connecting said Cardan shaft to both said power source and said axle, said spring metal plates each being disposed in a plane normal to the axis of said shaft and varying in thickness from their outer to their inner edges.

7. A drive as claimed in claim 6, wherein said spring metal plates each comprise a plurality of laminations of different radial widths.

8. A drive as claimed in claim 6, wherein said spring metal plates each comprise a plurality of laminations of different radial widths, the outer laminations being of less radial width than an inner lamination.

9. A drive for a vehicle axle comprising an axle secured to driving wheels, a hollow Cardan shaft surrounding said axle, a source of power for driving said Cardan shaft, and means including coupling members of radially rigid arcuate form connecting said Cardan shaft to said power source and said axle, said coupling members each including a plurality of annular segments each disposed in a plane normal to the axis of said shaft.

10. A drive according to claim 1 in which the bolt members connected to the respective shafts are disposed in diametrically opposed relation.

11. A drive according to claim 4 wherein said radial arms secured to said Cardan shaft are symmetrically arranged around the same.

HEINRICH RUEGG.